3,350,281
PROCESS FOR SEPARATING ADIPONITRILE FROM REACTION MIXTURE BY STRIPPING WITH AMMONIA

Roberto Romani and Mario Ferri, Novara, Italy, assignors to Società Rhodiatoce S.p.A., Milan, Italy
No Drawing. Filed Feb. 10, 1964, Ser. No. 343,451
Claims priority, application Italy, Feb. 20, 1963, 3,532/63
3 Claims. (Cl. 203—29)

Our invention relates to an improved process for separating the useful products obtained in the reaction between adipic acid and ammonia at high temperature, in the presence of dehydration catalysts. In particular, we separate adiponitrile, omega-cyanovaleramide, adipamide and other similar products from the non-volatile by-products and catalyst.

In processing crude adiponitrile, produced by reacting adipic acid and ammonia, a fraction is always obtained containing adiponitrile, together with a higher or lower amount of intermediate products, by-products and possibly the catalyst itself.

The problem of recovering the useful products from these mixtures is difficult. It is known that the commonly used distillation methods do not lead to satisfactory results. Even operating under the most suitable conditions, that is the use of particularly high vacuum and very short distillation periods, such as those employed for instance with a film evaporator, while the recovery of adiponitrile and a great portion of omega-cyanovaleramide is facile enough, it is impossible to recover the other intermediate products, such as adipamide. This is due to the fact that such intermediates do not distill and decompose to a great extent under conditions of high vacuum and rapid distillation.

In order to recover the useful products, contained in the above-mentioned fractions, it has also been found possible by known methods to react the product with ammonia, thereby transforming the intermediate products into adiponitrile, which may then be separated from other non-volatile products by distillation under vacuum. However, in order to carry out this transformation in the most advantageous way, the necessary operating conditions (for example, a long staying time) results in a considerable decrease in yield.

We have now found a convenient method, which is an object of our invention, by which useful products are separated from these fractions with almost quantitative yields. Our method is particularly adapted to exhausting those products having a high content of non-volatile components, (e.g. adipamide, tars, catalysts, etc.) for which distillation under reduced pressure is not suitable.

According to our invention, the product is subjected to a stream of ammonia at an elevated temperature. This product may be the crude product coming from the reaction, at high temperature and in the presence of catalysts of adipic acid and ammonia or the crude product from which adiponitrile has been wholly or partially distilled. Or more generally, it may be a mixture of volatile and non-volatile products resulting from the aforesaid reaction between adipic acid and ammonia, from which adiponitrile and the intermediates useful for manufacturing adiponitrile may be recovered.

By realizing good contact between gas and liquid, adiponitrile and the intermediate products are almost quantitatively transformed into vapor, while the non-volatile byproducts and catalyst remain as relatively fluid residue at the reaction temperature. During the ammonia and heat treatment, the intermediate products of the reaction do not decompose and, if dehydration catalyst is present, a transformation of intermediate products into adiponitrile or into their most proximate intermediate products occurs.

The process according to our invention may be performed in apparatus of the most diversified type, such as a vessel provided with agitator, a column provided with heated plates or a thin layer evaporator. In all these cases, it has been found, that best results were obtained by using such apparatus and working conditions as provided for short treatment periods and assured continuous discharge of exhaust residues. The use of a thin film evaporator, preferably provided with agitator, gave particularly good results. This type of apparatus makes possible good heat exchange and good contact between liquid and gas, so that the treatment time is reduced to a few seconds. The treatment can be carried out, and results are practically the same, either in equicurrent or in countercurrent flow of gas to product.

It is important to use a heating medium having as uniform a temperature as possible, such as condensing vapors or circulating liquids (Dowtherm, mineral oils, etc.). The temperature of the products leaving the evaporator is generally between 220° and 350° C. At lower temperatures exhaustion of intermediates is not complete; at higher temperatures exhaustion is complete, but a thickening of the exhaust mass may occur thus causing difficulties during the discharging operation. Preferably the temperature is between 250° and 300° C., and the treatment is carried out at atmospheric or slightly higher pressure. The ammonia is used in amounts between 0.1 and 20 Nm.$^3$/kg./h. of crude product fed into the exhauster, preferably 1–10 Nm.$^3$/kg./h. The products leaving the evaporator may or may not be recycled to the nitrilation after being condensed or they can be recycled in the gaseous state together with ammonia.

The following specific examples will serve to describe the invention further but they are not intended to limit the invention thereto. They are only given for purposes of illustration. Specifically, Example 1 reports results obtained by distillation according to known methods, so that it may be possible to present more clearly the advantages that can be attained by using the process according to our invention.

Example 1

3.1 kg./h. of a fraction, obtained from continuous manufacture of adiponitrile in liquid phase from adipic acid and ammonia in the presence of phosphoric acid, were fed continuously to the upper part of a film evaporator (diameter 60 mm., height of the heated part 500 mm.) provided with agitator (1500 r.p.m.). This fraction consisted of:

| | Percent |
|---|---|
| Adiponitrile | 22.2 |
| Omega-cyanovaleramide | 34.6 |
| Non-distillable intermediates | 34.2 |
| Catalyst (as $H_3PO_4$) | 0.5 |
| Tar-like by-products | 8.5 |

At a residual pressure of 1 mm. Hg and by heating with Dowtherm vapors condensing at 300° C., 1.725 kg./h. of a product (38.5% of adiponitrile, 58% of omega-cyanovaleramide) was obtained as distillate and recovered. From the bottom of the evaporator 1.25 kg./h. of residue containing useful intermediates (adipamide) were discharged as waste. It will be seen therefore that this method is not advantageous, because only about 65% of the products contained in the starting material and still useful for the manufacturing adiponitrile, were recovered.

Example 2

3.1 kg./h. of the product according to Example 1 were continuously introduced into the upper part of the film evaporator according to Example 1.

While heating with Dowtherm vapors condensing at 310° C., 8 Nm.³/h. of gaseous ammonia were fed to the lower part of the evaporator and in countercurrent with the introduced product.

By cooling the vapors leaving the evaporator, 2.7 kg./h. of a condensed product were obtained consisting of 38% adiponitrille, 47.5% omega-cyanovaleramide, 6.5% adipamide and 5% water. From the bottom of the evaporator 0.5 kg./h. of a residue, practically free of products useful for manufacturing adiponitrile, are discharged as waste.

Operating in this manner, not only was partial conversion of intermediate product into adiponitrile and omega-cyanovaleramide realized, but nearly all (about 96%) of the useful intermediates present in the starting product were recovered.

Whenever possible, the vapors leaving the evaporator, can be directly employed in the process of manufacturing adiponitrile without undergoing condensation.

Example 3

Into the same evaporator according to the preceding examples were fed continuously 5 kg./h. of a fraction, obtained in the continuous manufacture of adiponitrile in liquid phase from adipic acid and ammonia, in the presence of diammonium phosphate catalyst. The fraction had the following composition:

|  | Percent |
|---|---|
| Adiponitrile | 60.0 |
| Omega-cyanovaleramide | 30.0 |
| Non-distillable intermediates | 7.3 |
| Catalyst (as $H_3PO_4$) | 0.2 |
| Tar-like by-products | 2.5 |

By sending 6 Nm.³/h. of ammonia to the upper part of the evaporator (heater by Dowtherm vapors condensing at 330° C.) in equicurrent with the introduced product, a practically complete stripping of all the useful products was obtained, these products being cooled at the evaporator outlet. 4.75 kg./h. of a condensate were obtained, having the following composition: 73% of adiponitrile, 20% of omega-cyanovaleramide, 3% of adipamide, 2% of water. From the bottom of the evaporator 0.25 kg./h. of exhausted residues were discharged as waste.

In this manner about 98% of useful products present in the starting material were recovered. These products may be reused for manufacturing adiponitrile.

Example 4

Into the same evaporator according to the preceding examples were continuously fed 1.2 kg./h. of a fraction, obtained in the continuous manufacture of adiponitrile in liquid phase from adipic acid and ammonia, in the presence of phosphoric acid catalyst. The fraction had the following composition:

|  | Percent |
|---|---|
| Adiponitrile | 28.5 |
| Omega-cyanovaleramide | 37.2 |
| Non-distillable intermediates | 26.9 |
| Catalyst (as $H_3PO_4$) | 0.4 |
| Tar-like by-products | 7.0 |

20 Nm.³/h. of ammonia previously preheater at 200° C. were fed into the lower part of the evaporator and in countercurrent with the introduced product. The heating of the evaporator was carried out by Dowtherm vapors condensing at 340° C. From the bottom of the evaporator 0.23 kg./h. of exhausted residues were discharged as waste. The useful products that were carried over were cooled at the evaporator outlet. 0.95 kg. of a condensate consisting of a mixture of adiponitrile and of useful intermediates were obtained; the equivalent in adiponitrile in this mixture amounted to 0.908 kg. for a 94% recovery of the useful products.

We claim:
1. A process for the separation of adiponitrile and byproducts convertible to adiponitrile, said byproducts comprising omega-cyanovaleramide and adipamide, from the non-volatile tarry byproducts and from catalyst contained in the liquid mixture produced by the high temperature reaction between adipic and ammonia in the presence of a dehydration catalyst, which comprises stripping said mixture by passing therethrough gaseous ammonia at normal pressure and a temperature between 220° and 350° C.

2. The process of claim 1, wherein the gaseous ammonia is introduced at a flow rate between 0.1 and 20 Nm.³/kg. of said mixture.

3. The process of claim 1, wherein the gaseous ammonia is introduced at a flow rate between 1 and 10 Nmf.³/kg. of said mixture at a temperature between 250° and 300° C.

References Cited

UNITED STATES PATENTS

| 2,616,838 | 11/1952 | Williams | 203—49 |
| 3,133,953 | 5/1964 | Miwa et al. | 260—465.8 |
| 3,177,242 | 4/1965 | Adam et al. | 260—465.8 |

FOREIGN PATENTS

| 728,522 | 4/1955 | Great Britain. |
| 731,458 | 6/1955 | Great Britain. |

NORMAN YUDOFF, *Primary Examiner.*

WILBUR L. BASCOMB, Jr., *Examiner.*